Patented May 4, 1948

2,440,708

UNITED STATES PATENT OFFICE 2,440,708 d-CHONDOCURARINE HALIDES AND PROCESS FOR MAKING SAME

Oskar Wintersteiner and James D. Dutcher, New Brunswick, N. J., assignors to E. R. Squibb & Sons, New York, N. Y., a corporation of New York No Drawing. Application March 16, 1943, Serial No. 479,378

4 Claims. (Cl. 260—236)

This invention relates to derivatives of the curare alkaloids.

Curare is a plant extract characterized by a relaxing (lissive) effect on the musculature. It has been used, with good results, in the treatment of spastic paralysis, a distressing condition frequently following cerebral injuries at childbirth, and also in combination with anesthesia during surgical operations; and it has come into medical prominence lately as a means for moderating the convulsions in the shock-therapy of certain psychoses.

The therapeutic use of curare, though promising, was limited because of the difficulty of providing curare preparations of constant composition and potency; a difficulty due primarily to the uncertain botanical origin of the available crude curare preparations, which had to be supplied by explorers, and to the contamination of these preparations with other poisons, snake venoms, and other materials, active and inactive. Constant potency and identical action is essential for the therapeutic utility of a curare preparation, since curare's margin of safety (the range of dosage between that giving the desired skeletal-muscle effect and that giving the undesirable toxic paralysis of the muscles of respiration) is very small.

As disclosed in application Ser. No. 442,094, filed May 7, 1942, now abandoned, it was found that curare preparations of constant composition and high potency, and particularly crystalline d-curarine chloride, could be obtained from the plant *Chondodendron tomentosum* (known to the Amazonian Indians as Ampi Huasca), especially if the plant were used in the fresh (rather than dried) state; and as a by-product there were obtained certain novel tertiary bases of negligible lissive potency, and these bases were isolated in pure form, and identified as follows:

(1) A crystalline tertiary base which melts at 232–234° C. and has an $[\alpha]_D+190°$ in normal HCl.

(2) A crystalline tertiary base which has the empirical formula $C_{36}H_{38}O_6N_2$, melts at 160° C., and has an $[\alpha]_D-167°$ in chloroform.

These bases may be obtained as follows: 100 kg. fresh, green liana stems of *Chondodendron tomentosum* (Ampi Huasca) is cut into pieces of convenient size and extracted with water that has been acidified to pH about 5 with hydrochloric acid. The extract is concentrated until about 4 kg. of a syrupy or molasses-like liquid is obtained, and then carefully brought to dryness in vacuo at 55–60° C. The resulting dry brown powder, a crude curare, constitutes about half the weight of the syrup. 50 g. of the crude curare is exhaustively extracted at room temperature with 400 cc. portions of a 1% aqueous solution of tartaric acid. The dark brown extract is filtered to remove insoluble material (about 2.5 g.), made alkaline by the addition of saturated sodium bicarbonate solution, and exhaustively extracted with chloroform; and the extract is separated from the aqueous phase. The chloroform extract contains about 3 g. of extracted material comprising tertiary bases of comparatively low lissive potency. On dissolving the extracted material in methanol, a crystalline deposit is formed; and after chilling for several hours, the crystalline material (weighing about 500 mg.) is separated by filtration. The crystalline material, after recrystallization from hot methanol, melts at 232–234° C., has an $[\alpha]_D+190°$ in normal hydrochloric acid, and has the empirical formula $C_{36}H_{38}O_6N_2$. The residue, obtained by evaporating the methanolic mother liquor, is dissolved in benzene and chromatographed on $Al_2O_3$. The fraction (about 500 mg.) eluted with benzene containing 1% methanol yields, after purification by recrystallization from hot benezene or chloroform, a tertiary base, $C_{36}H_{38}O_6N_2$, melting at 160° C. and having an $[\alpha]_D-167°$ in chloroform.

It has now been found that these tertiary bases may be converted into novel quaternary halides of high lissive potency, and that the dimethyl ethers of these halides have an extraordinarily high lissive potency.

Thus, base (1) above (which is now known to have the empirical formula $C_{36}H_{38}O_6N_2$ and to possess two free phenolic hydroxy groups and two methoxy groups, and has been named—and will hereinafter be referred to as—d-chondocurine) has been converted into a quaternary iodide which has the empirical formula $C_{38}H_{44}O_6N_2I_2$ and is believed to have the (bisbenzylisoquinoline) structural formula.

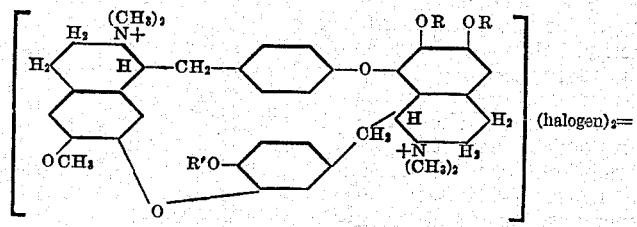

wherein R' and one of the R's is hydrogen and the other R is methyl. The corresponding quaternary base has been named—and will hereinafter be referred to as—d-chondocurarine.

Whereas d-chondocurine is practically completely devoid of lissive activity, d-chondocurarine iodide has a potency of 20 Holaday units per mg. in the rabbit, i. e., about three times the potency of d-tubocurarine chloride. d-Chondocurarine chloride has the same potency as d-chondocurarine iodide, when allowance is made for the difference in weight of the anions.

[The potencies referred to herein were determined by the cross-over rabbit-head-drop method of Holaday application Serial No. 396,871 filed June 6, 1941, now Patent No. 2,397,417, dated March 26, 1946.]

Similarly, base 2 (which is isomeric with d-chondocurine and likewise possesses two free phenolic hydroxy groups and two methoxy groups and has now been prepared in even purer form which melts at 167° C. and has an $[\alpha]_D -248°$ in 0.1 normal HCl) has been converted into a quaternary iodide having a high lissive potency. The potency of the quaternary bases corresponding to d-chondocurine and the isomeric tertiary base (2) was unexpected, since other tertiary alkaloids of the bisbenzyl-isoquinoline type—e. g. d- or l-curine (bebeerine) and d-isochondodendrine (d-isobebeerine) — yield quaternary bases having no appreciable lissive activity.

It has been found, also, that these quaternary bases—d-chondocurarine halides and the isomeric quaternary bases derived from tertiary base (2) may be further methylated (on the two free phenolic hydroxy groups) to obtain the corresponding dimethylethers (i. e., compounds in which all four phenolic hydroxy groups are methylated) and that these dimethylethers have lissive potencies (in the rabbit) many times that of the parent quaternary bases. Thus, further methylation of d-chondocurarine iodide (d-chondocurine dimethiodide) results in a threefold increase in lissive potency (in the rabbit); and the resulting compound has been found to be identical with the d-tubocurarine dimethylether iodide heretofore prepared from d-tubocurarine iodide (cf. section f of Example 1 in application Ser. No. 442,094). The compounds d-tubocurarine iodide and d-tubocurarine dimethylether iodide are believed to have the structural formula given hereinbefore, wherein R' and one of the R's is hydrogen, and the other R is methyl, and wherein R' and both R's are methyl (respectively).

The following examples are illustrative of the invention:

EXAMPLE 1

*Preparation of d-chondocurarine iodide*

500 mg. of crystalline d-chondocurine (the tertiary base melting at 232-234° C. described in section g, Example 1 of application Ser. No. 442,094) is dissolved in methanol, 1.0 ml. methyl iodide is added, and the reaction mixture is refluxed for two hours. The methanol and excess methyl iodide are then removed by vacuum distillation; the amorphous residue is extracted with hot water, and the hot extract is treated with a small amount of charcoal, and filtered. On cooling, d-chondocurarine iodide (d-chondocurine dimethiodide) is obtained as a nearly colorless amorphous precipitate, melting at 275° C. (with decomposition) and having an $[\alpha]_D +180°$ in methanol. Addition of some potassium iodide to the original hot solution increases the yield of the product (by lowering the solubility) almost to quantitative.

EXAMPLE 2

*Preparation of d-chondocurarine chloride* d-Chondocurarine iodide is shaken with an excess of freshly precipitated silver chloride in aqueous suspension; and after filtering off the silver iodide and excess silver chloride, the aqueous solution is concentrated to dryness in vacuo. The residue, d-chondocurarine chloride (d-chondocurine dimethochloride) is a colorless, viscous syrup which does not crystallize, is very soluble in water, and has an $[\alpha]_D +175°$ in water.

EXAMPLE 3

*Preparation of d-tubocurarine dimethylether iodide from d-chondocurine*

530 mg. d-chondocurine is suspended in 5 ml. methanol, and 8.0 ml. 0.5 normal KOH in methanol and 1.0 ml. methyl iodide are added. On warming, the solid material dissolves; and after refluxing for one hour, half as much again of KOH and methyl iodide are added, and the solution is refluxed for another hour. On cooling, the solution deposits large colorless prisms of d-tubocurarine dimethylether iodide; and recrystallization from hot water containing a little potassium iodide yields the trihydrate melting at 254-256° C. and having an $[\alpha]_D +160°$ in water. The product is identical with that obtained from d-tubocurarine iodide by methylation of the two free phenolic hydroxy groups.

EXAMPLE 4

*Preparation of the dimethiodide of tertiary base (2)*

50 mg. of tertiary base (2)—the tertiary base melting at 160° C. (or the purer form melting at 167° C.) disclosed in section g, Example 1 of application Ser. No. 442,094—is dissolved in 0.1 ml. methyl iodide; and on standing 12-16 hours at room temperature, the quaternary base iodide (dimethiodide) deposits in quantitative yield as long, colorless needles. After washing free of excess methyl iodide and drying in vacuo, the product melts at 250° C. (with decomposition) and has an $[\alpha]_D -135°$ in methanol.

EXAMPLE 5

*Preparation of the dimethylether dimethiodide of tertiary base (2)*

100 mg. of the crystalline dimethiodide obtained in Example 4 is dissolved in 2 ml. methanol, and 3.0 ml. 0.5 normal methanolic KOH and 0.5 ml. methyl iodide are added; and after refluxing the solution for an hour, half as much again of the KOH and methyl iodide are added, and the refluxing continued for another hour. The solvent is then removed by vacuum distillation, and the residue extracted with small portions of hot water; and on cooling the aqueous extract, the dimethylether is obtained as an amorphous precipitate fairly soluble in water but less in potassium iodide solution.

The methyl iodide used in the foregoing examples for the preparation of the dimethylethers may be replaced by ethyl iodide or propyl iodide to obtain the corresponding compounds wherein R' and one of the R's in the structural formula given hereinbefore represent ethyl or propyl. d-Tubocurarine diethylether iodide, thus obtained, has a lissive potency (in the rabbit) higher than that of d-tubocurarine chloride.

The tertiary base dimethohalides described hereinbefore and their di-ethers may be employed clinically as lissive agents for the voluntary musculature in the same manner as d-tubocurarine chloride; e. g., by the slow intravenous infusion of their aqueous solutions of suitable concentration (based on the lissive potency of the compound in the human).

The invention may be variously otherwise embodied within the scope of the appended claims.

We claim:

1. A d-chondocurarine halide having the empirical formula $C_{38}H_{44}O_6N_2$ (halogen)$_2$, being the dimethohalide of d-chondocurine, a tertiary base obtained from *Chondodendron tomentosum* and melting at 232–234° C.

2. d-Chondocurarine chloride, having the empirical formula $C_{38}H_{44}O_6N_2Cl_2$, a colorless, viscous, highly water-soluble syrup, being the dimethochloride of d-chondocurine, a tertiary base obtained from *Chondodendron tomentosum* and melting at 232–234° C.

3. d-Chondocurarine iodide, having the empirical formula $C_{38}H_{44}O_6N_2I_2$ and melting with decomposition at 275° C., being the dimethiodide of d-chondocurine, a tertiary base obtained from *Chondodendron tomentosum* and melting at 232–234° C.

4. The method which comprises reacting methyl iodide with d-chondocurine, a tertiary base obtained from *Chondodendron tomentosum* having the empirical formula $C_{36}H_{38}O_6N_2$ and melting at 232–234° C.

OSKAR WINTERSTEINER.
JAMES D. DUTCHER.

REFERENCES CITED

The following references are of record in the file of this patent:

J. Chem. Soc. (London) 1935; pp. 1381–1389.
J. Chem. Soc. (London) 1937; pp. 1472–1482.
Science, May 21, 1943; pages 467–470.

Certificate of Correction

Patent No. 2,440,708. May 4, 1948.

OSKAR WINTERSTEINER ET AL.

It is hereby certified that errors appear in the printed specification of the above numbered patent requiring correction as follows: Column 2, line 46, strike out the period after the word "formula"; same column, in the formula, upper left-hand ring, for —\\<sup>N+</sup> read —\\<sup>N+</sup> lower right-hand ring, for +N/— read +N— and that the said Letters Patent should be read with these corrections therein that the same may conform to the record of the case in the Patent Office.

Signed and sealed this 13th day of July, A. D. 1948.

[SEAL]

THOMAS F. MURPHY,
*Assistant Commissioner of Patents.*